UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

CARBORUNDUM ABRASIVE ARTICLE.

978,679. Specification of Letters Patent. Patented Dec. 13, 1910.

No Drawing. Application filed April 1, 1908. Serial No. 424,599.

*To all whom it may concern:*

Be it known that I, FRANK J. TONE, of Niagara Falls, Niagara county, New York, have invented a new and useful Carborundum Abrasive Article, of which the following is a full, clear, and exact description.

My invention has relation to carborundum abrasive articles, composed of carborundum grains and a vitrified binding material, the novel feature consisting principally in the character of the binder and its fluxing constituents for the purpose of giving increased strength and better texture to the formed ceramic bodies.

For the purpose of introducing the fluxing constituents of the binder, I employ a lime-alkali-bearing mineral, such as pegmatite. The pegmatite commonly used in the ceramic industries, is that known as Cornwall stone, but any pegmatite or other suitable lime-bearing mineral may be used without departing from the principle of my invention.

The following mixture will serve as a typical one to illustrate the manner of producing the article. I take carborundum grains 78 parts, Cornwall stone 18 parts, kaolin 3 parts, flint 1 part. The carborundum grains may be of any grade of coarseness or fineness, according to the requirements of the article and the nature of the abrasive work to be performed by it, and the other constituents named are in the ground or powdered form in which they are ordinarily supplied to the trade. These ingredients are thoroughly mixed in a dry state, and then moistened with sufficient water to bring them to about the consistency of molding sand. The mixture is then placed in an iron mold of the shape desired for the finished article, and subjected to heavy pressure. It is then removed from the mold, dried and fired in a kiln to a temperature of about 2500 degrees F. The superiority of this binder I attribute to the fact that the soda-lime or potash-lime porcelain formed shows greater toughness and resistance to wear than regular soda and potash porcelains without lime.

Certain so-called clays, which are mixtures of kaolinite and various silicates carry a high proportion of lime and of alkali, may be used to obtain the same or similar composition, and the lime in the form of carbonate or other compounds may also be used in the mixture to obtain in the ceramic body the special qualities herein described.

I do not confine myself to the use of the mixtures herein stated but may use many of the lime-bearing minerals available for ceramic purposes to accomplish the fusion of the bond and to impart the requisite strength and wearing qualities.

I claim:—

As a new article of manufacture, a molded ceramic body composed of crystalline carborundum and a vitrified binder formed from a mixture of a lime-bearing material, kaolinite and flint.

In testimony whereof, I have hereunto set my hand.

FRANK J. TONE.

Witnesses:
CHARLES CHORMANN,
EDMUND S. SMITH.